(12) United States Patent
Su

(10) Patent No.: US 10,454,905 B2
(45) Date of Patent: Oct. 22, 2019

(54) METHOD AND APPARATUS FOR ENCRYPTING AND DECRYPTING PICTURE, AND DEVICE

(71) Applicant: Tencent Technology (Shenzhen) Company Limited, Shenzhen (CN)

(72) Inventor: Lihong Su, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 226 days.

(21) Appl. No.: 15/705,098

(22) Filed: Sep. 14, 2017

(65) Prior Publication Data

US 2018/0007019 A1 Jan. 4, 2018

Related U.S. Application Data

(63) Continuation-in-part of application No. PCT/CN2016/100113, filed on Sep. 26, 2016.

(30) Foreign Application Priority Data

Oct. 19, 2015 (CN) .......................... 2015 1 0676194

(51) Int. Cl.
*G06F 21/60* (2013.01)
*H04L 29/06* (2006.01)
(Continued)

(52) U.S. Cl.
CPC .......... *H04L 63/0428* (2013.01); *G06F 21/60* (2013.01); *G06F 21/606* (2013.01);
(Continued)

(58) Field of Classification Search
CPC . H04L 63/0428; H04L 9/3239; H04L 9/0822; H04L 9/0819; H04L 63/126;
(Continued)

(56) References Cited

U.S. PATENT DOCUMENTS 7,310,731 B2 * 12/2007 Ishibashi ................. G06F 21/10
705/51
7,508,941 B1 * 3/2009 O'Toole, Jr. ...... G08B 13/19671
380/228
(Continued)

FOREIGN PATENT DOCUMENTS

CN 1183685 A 6/1998
CN 101262340 * 9/2008 ............... H04L 9/30
(Continued)

OTHER PUBLICATIONS

Tencent Technology, ISRWO, PCT/CN2016/100113, Dec. 27, 2016, 9 pgs.

(Continued)

*Primary Examiner* — Carl G Colin
*Assistant Examiner* — Hany S. Gadalla
(74) *Attorney, Agent, or Firm* — Morgan, Lewis & Bockius LLP

(57) ABSTRACT

The present disclosure relates to the field of computer technologies and it discloses a method for encrypting a picture performed at a sending device, the method including: obtaining, by a sending device raw data of a to-be-encrypted picture, a first key, a second key, and location information that is used for adding disturbance data to the raw data; generating the disturbance data, and adding the disturbance data to the raw data according to the location information, to obtain first data; encrypting the first data by using the first key, to obtain the second data, and encrypting the first key and the length of the disturbance data by using the second key, to obtain first encrypted data; and sending the second data, the first encrypted data, and the second key to a receiving device.

20 Claims, 7 Drawing Sheets

(51) Int. Cl.
*H04L 9/08* (2006.01)
*H04L 9/14* (2006.01)
*H04L 9/30* (2006.01)
*H04L 9/32* (2006.01)

(52) U.S. Cl.
CPC .......... *H04L 9/0819* (2013.01); *H04L 9/0822* (2013.01); *H04L 9/14* (2013.01); *H04L 9/30* (2013.01); *H04L 9/3239* (2013.01); *H04L 63/0435* (2013.01); *H04L 63/126* (2013.01); *G06F 2221/2107* (2013.01); *G06F 2221/2111* (2013.01); *H04L 2209/046* (2013.01); *H04L 2463/062* (2013.01)

(58) Field of Classification Search
CPC ......... H04L 63/0435; H04L 9/30; H04L 9/14; H04L 2209/046; H04L 2463/062; G06F 21/606; G06F 21/60; G06F 2221/2111; G06F 2221/2107
See application file for complete search history.

(56) References Cited

U.S. PATENT DOCUMENTS 8,108,674 B2 * 1/2012 Takeda ...................... H04L 9/16
                                                              380/277
2002/0080972 A1 * 6/2002 Kato ................. G11B 20/00086
                                                              380/277
2012/0016602 A1   1/2012 Fontvieille et al.
2012/0076300 A1 * 3/2012 Uchida ................. H04L 9/0822
                                                              380/255
2013/0070925 A1 * 3/2013 Yamada .................... H04L 9/08
                                                              380/255
2014/0205085 A1 * 7/2014 Janus ................... G06F 21/6209
                                                              380/28

FOREIGN PATENT DOCUMENTS

| CN | 103488915 A | 1/2014 | |
|---|---|---|---|
| CN | 103971323 A | 8/2014 | |
| CN | 104040937 A | 9/2014 | |
| CN | 104115440 A | 10/2014 | |
| JP | 2010028733 | * 2/2010 | ............... H04L 9/08 |
| WO | WO 2014175830 A1 | 10/2014 | |

OTHER PUBLICATIONS

Tencent Technology, IPRP, PCT/CN2016/100113, Apr. 24, 2018, 8 pgs.

* cited by examiner

METHOD AND APPARATUS FOR ENCRYPTING AND DECRYPTING PICTURE, AND DEVICE

RELATED APPLICATIONS

This application is a continuation-in-part application of PCT/CN2016/100113, entitled "METHOD AND DEVICE FOR ENCRYPTING PICTURE, METHOD AND DEVICE FOR DECRYPTING PICTURE, AND EQUIPMENT" filed on Sep. 26, 2016, which claims priority to Chinese Patent Application No. 201510676194.1, filed with the State Intellectual Property Office of the People's Republic of China on Oct. 19, 2015, and entitled "METHOD AND APPARATUS FOR ENCRYPTING AND DECRYPTING PICTURE", both of which are incorporated herein by reference in their entirety.

FIELD OF THE TECHNOLOGY

The present disclosure relates to the field of computer technologies, and in particular, to a method and an apparatus for encrypting and decrypting a picture, and a device.

BACKGROUND OF THE DISCLOSURE

With development of Internet technologies and popularization of intelligent terminals, functions of instant messaging applications become increasingly powerful. A user not only can send audio to another user by using an instant messaging application, but also can send a picture to the another user by using the instant messaging application. To ensure security of the picture, a sending device corresponding to the user needs to encrypt the picture before sending the picture, and sends the encrypted picture to a receiving device corresponding to the another user. Similarly, after receiving the encrypted picture, the receiving device decrypts the encrypted picture to obtain the picture.

A process in which the sending device encrypts the picture may be: The sending device obtains the picture that needs to be encrypted, encrypts the picture by using an encryption key to obtain the encrypted picture, sends the encrypted picture to the receiving device, and then sends a decryption key to the receiving device by using a secure method.

A process in which the receiving device decrypts the encrypted picture may be: The receiving device receives the encrypted picture sent by the sending device, receives the decryption key sent by the sending device, and decrypts the encrypted picture by using the decryption key to obtain the picture.

In a process of implementing the present disclosure, the inventor finds that the existing technology has at least the following problem:

When a third terminal other than a first terminal and a second terminal obtains the encrypted picture and the decryption key by means of network monitoring, the third terminal may decrypt the encrypted picture by using the decryption key. As a result, security of the encrypted picture is low.

SUMMARY

To resolve the problem in the existing technology, the present disclosure provides a method and an apparatus for encrypting and decrypting a picture, and a device. The technical solutions are as follows:

A method for encrypting a picture is provided, including:

obtaining, by a sending device, raw data of a to-be-encrypted picture, a first key, a second key, and location information that is used for adding disturbance data to the raw data;

adding, by the sending device, the disturbance data to the raw data according to the location information, to obtain first data;

encrypting, by the sending device, the first data by using the first key, to obtain second data, and encrypting the first key and the length of the disturbance data by using the second key, to obtain first encrypted data; and sending, by the sending device, the second data, the first encrypted data, and the second key to a receiving device.

A method for decrypting a picture is provided, including:

receiving, by a receiving device, second data, first encrypted data, and a second key that are obtained after a picture is encrypted and that are sent by a sending device;

decrypting, by the receiving device, the first encrypted data by using the second key, to obtain a first key and the length of disturbance data;

decrypting, by the receiving device, the second data by using the first key, to obtain first data; and deducting, by the receiving device, the disturbance data from the first data according to location information and the length of the disturbance data, to obtain raw data of the picture, where the location information indicates a location of the disturbance data in the raw data.

A sending device adds disturbance data to raw data of a picture, encrypts the raw data by using a first key, to obtain second data, and encrypts the first key and location information of the disturbance data by using a second key, to obtain first encrypted data. Therefore, another device other than a receiving device cannot obtain the first key or the location information of the disturbance data even though obtaining the first encrypted data, and therefore, cannot obtain the raw data by decrypting the second data by using the first key and the location information of the disturbance data, thereby improving security of the raw data of the transmitted picture.

An apparatus for encrypting a picture is provided, including:

a first obtaining module, configured to obtain raw data of a to-be-encrypted picture, a first key, a second key, and location information that is used for adding disturbance data to the raw data;

an adding module, configured to add the disturbance data to the raw data according to the location information, to obtain first data;

a first encryption module, configured to: encrypt the first data by using the first key, to obtain second data, and encrypt the first key and the length of the disturbance data by using the second key, to obtain first encrypted data; and a first sending module, configured to send the second data, the first encrypted data, and the second key to a receiving device.

An apparatus for decrypting a picture is provided, including:

a first receiving module, configured to receive second data, first encrypted data, and a second key that are obtained after a picture is encrypted and that are sent by a sending device;

a first decryption module, configured to decrypt the first encrypted data by using the second key, to obtain a first key and the length of disturbance data;

a second decryption module, configured to decrypt the second data by using the first key, to obtain first data; and a deduction module, configured to deduct the disturbance data from the first data according to location information and the length of the disturbance data, to obtain raw data of the picture, where the location information indicates a location of the disturbance data in the raw data.

A sending device is provided, including: one or more processors; and a memory, the memory storing one or more programs, the one or more programs being configured to be executed by the one or more processors, and the one or more programs including instructions used for performing the following operations:

obtaining raw data of a to-be-encrypted picture, a first key, a second key, and location information that is used for adding disturbance data to the raw data;

adding the disturbance data to the raw data according to the location information, to obtain first data;

encrypting the first data by using the first key, to obtain second data, and encrypting the first key and the length of the disturbance data by using the second key, to obtain first encrypted data; and sending the second data, the first encrypted data, and the second key to a receiving device.

A receiving device is provided, including: one or more processors; and a memory, the memory storing one or more programs, the one or more programs being configured to be executed by the one or more processors, and the one or more programs including instructions used for performing the following operations:

receiving second data, first encrypted data, and a second key that are obtained after a picture is encrypted and that are sent by a sending device;

decrypting the first encrypted data by using the second key, to obtain a first key and the length of disturbance data;

decrypting the second data by using the first key, to obtain first data; and deducting the disturbance data from the first data according to location information and the length of the disturbance data, to obtain raw data of the picture, where the location information indicates a location of the disturbance data in the raw data.

In the embodiments of the present disclosure, a sending device obtains raw data of a to-be-encrypted picture, a first key, a second key, and location information that is used for adding disturbance data to the raw data; the sending device generates the disturbance data; the sending device adds the disturbance data to the raw data according to the location information, to obtain first data; and the sending device encrypts the first data by using the first key, to obtain second data, encrypts the first key and the length of the disturbance data by using the second key, to obtain first encrypted data, and sends the second data, the first encrypted data, and the second key to a receiving device. Because the disturbance data is added to the raw data, security of the raw data of the picture can be improved.

BRIEF DESCRIPTION OF THE DRAWINGS

FIG. 1-2 is a flowchart of a method for decrypting a picture according to some embodiments of the present disclosure;

FIG. 2 is a flowchart of a method for encrypting a picture according to some embodiments of the present disclosure;

DESCRIPTION OF EMBODIMENTS

To make the objectives, technical solutions, and advantages of the present disclosure clearer, the following further describes embodiments of the present disclosure in detail with reference to the accompanying drawings.

At present, a user usually performs a chat with another user by using a social networking application (e.g., an instant messaging application), each user texting to the other user from its mobile terminal that is usually connected to a remote server supporting such application. Chat content not only includes texts and audio, but also may include pictures and the like. In a chat process, a sender may send a picture to a receiver. In some embodiments, the sender may provide a comment for the picture, which is also sent to the receiver. To improve security of the sent picture, the sender may encrypt the picture when sending the picture. Correspondingly, the receiver needs to decrypt the picture when receiving the picture. In the present disclosure, a picture may be encrypted or decrypted by using any one of the following embodiments.

Figure 1:
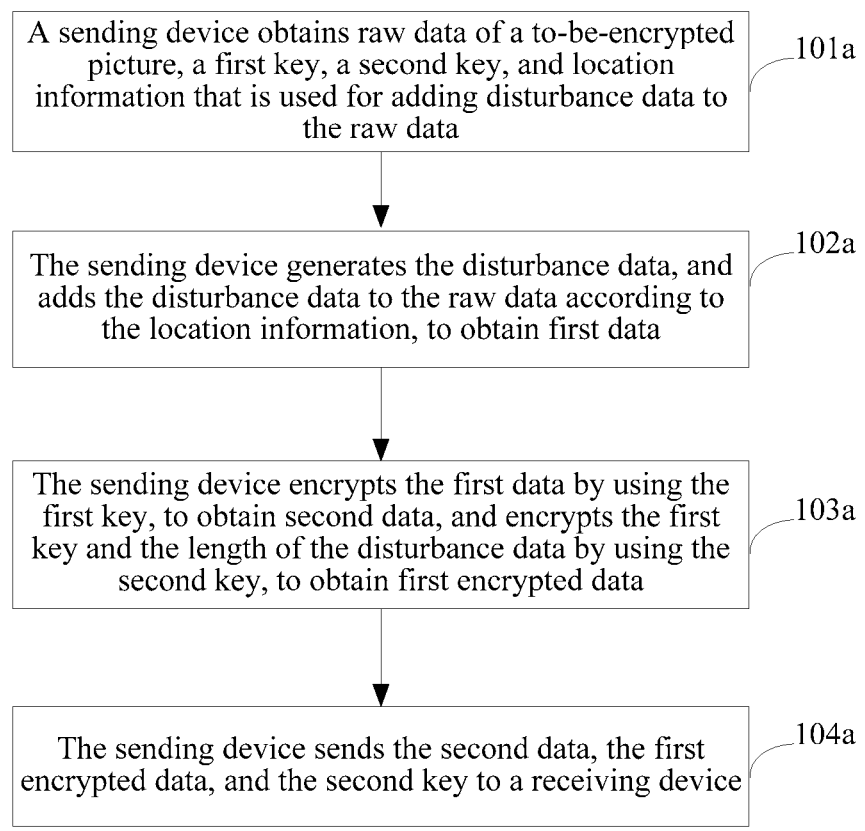
FIG. 1-1 is a flowchart of a method for encrypting a picture according to some embodiments of the present disclosure.

This embodiment of the present disclosure provides a method for encrypting a picture. The method is executed by a sending device. Referring to FIG. 1-1, the method includes the following operations:

Operation 101a: A sending device obtains raw data of a to-be-encrypted picture, a first key, a second key, and location information that is used for adding disturbance data to the raw data.

Operation 102a: The sending device generates the disturbance data, and adds the disturbance data to the raw data according to the location information, to obtain first data.

Operation 103a: The sending device encrypts the first data by using the first key, to obtain second data, and encrypts the first key and the length of the disturbance data by using the second key, to obtain first encrypted data.

Operation 104a: The sending device sends the second data, the first encrypted data, and the second key to a receiving device.

As shown above, the presence of the disturbance data in the first data and its arbitrarily determined location within the first data introduce two additional factors for protecting the raw data from being easily hacked by an unauthorized party. In some embodiments, the user of the sending device may choose the disturbance data to be his personal favorite poem, a movie line of his favorite or the like that is unrelated to the raw data to be transmitted to the receiving device. In some other embodiments, the disturbance data is related to the raw data (e.g., a picture), such as the comment that the user of the sending device has provided for the picture. The user of the sending device and the user of the receiving device have a prior agreement about the location of the disturbance data in the first data. For example, the user of the sending device may send a separate text message to the user of the receiving device about the location information for the disturbance data to be added to the first data before performing the encryption process. In some embodiments, the sending device uses a predefined algorithm and a current timestamp of sending the encrypted data for determining the location information. The receiving device can use the predefined algorithm and a timestamp of receiving the encrypted data (which is normally within a short time window from the timestamp of sending the encrypted data) for recovering the location information used for adding the disturbance data.

Figures 1, 2:
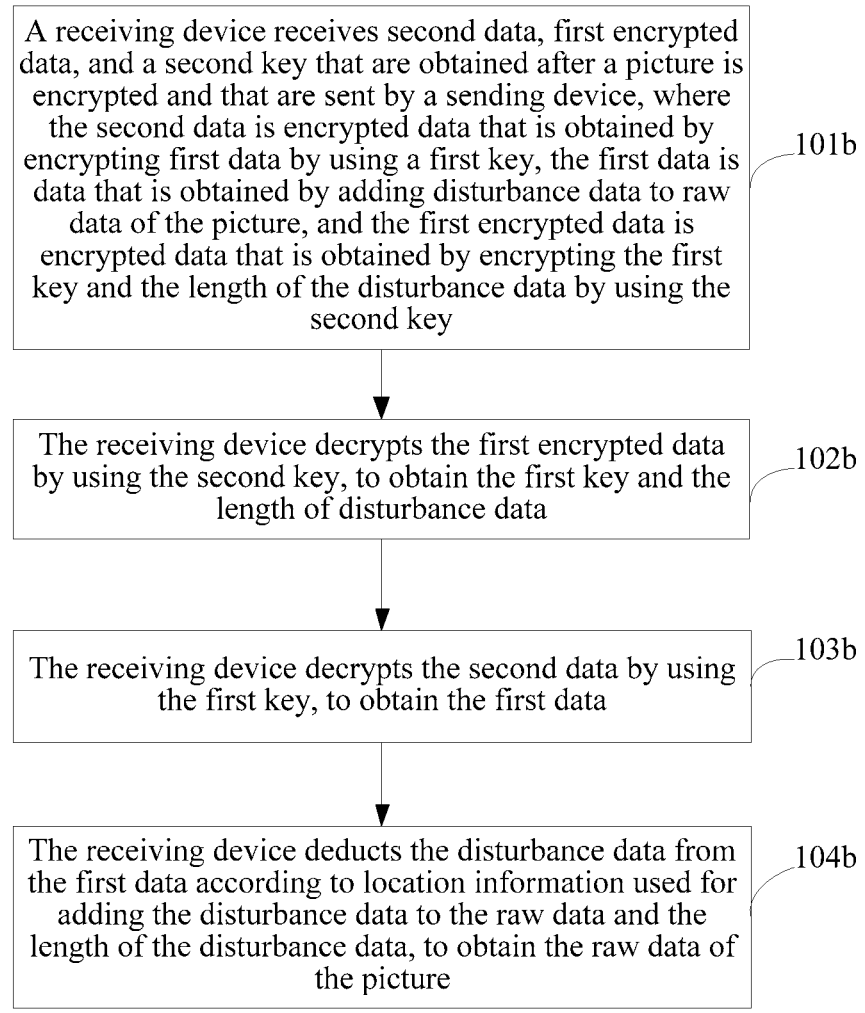
Figure 2:
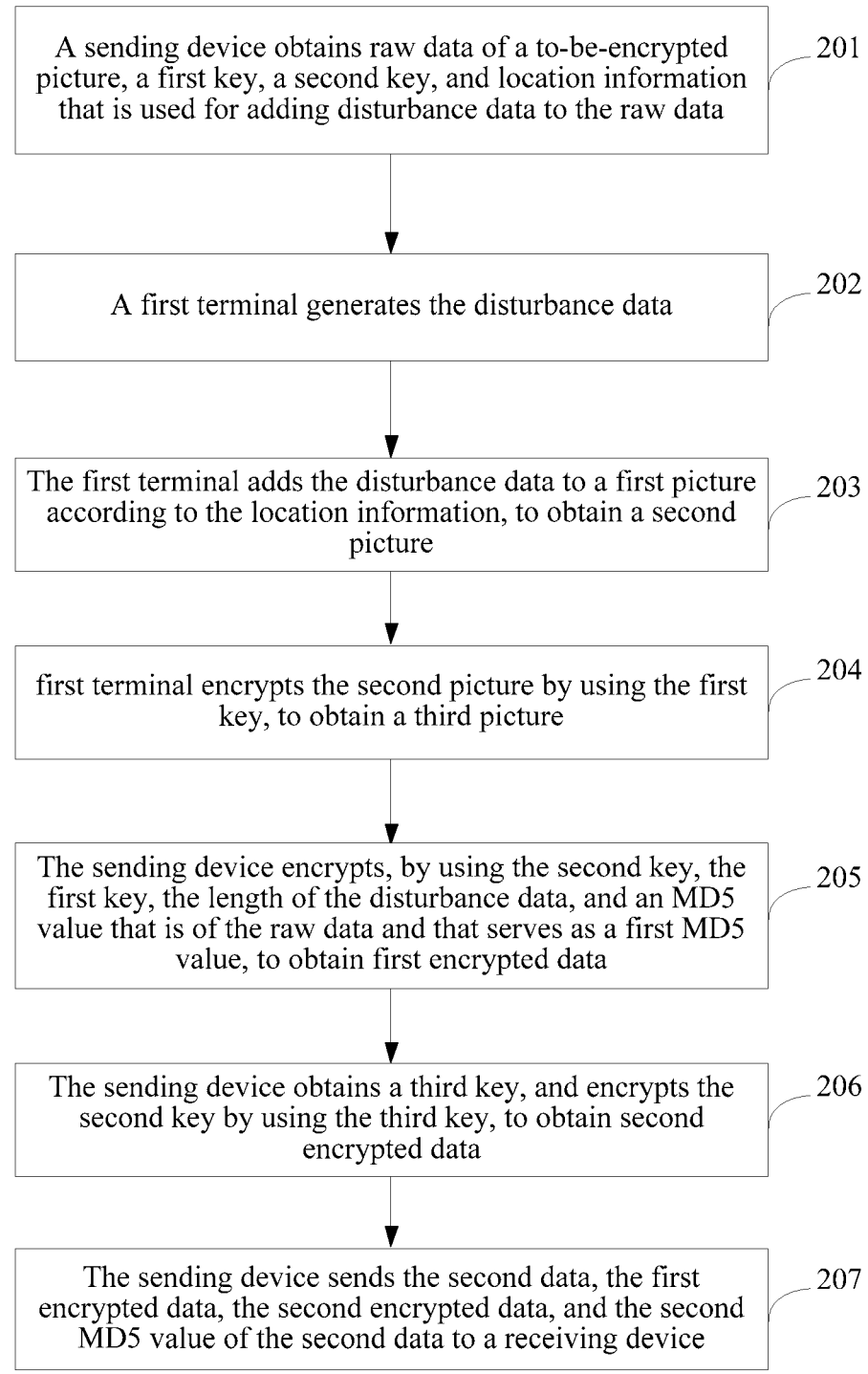

This embodiment of the present disclosure provides a method for decrypting a picture. The method is executed by a receiving device. Referring to FIG. 1-2, the method includes the following operations:

Operation 101b: A receiving device receives second data, first encrypted data, and a second key that are obtained after a picture is encrypted and that are sent by a sending device, where the second data is encrypted data that is obtained by encrypting first data by using a first key, the first data is data that is obtained by adding disturbance data to raw data of the picture, and the first encrypted data is encrypted data that is obtained by encrypting the first key and the length of the disturbance data by using the second key.

Operation 102b: The receiving device decrypts the first encrypted data by using the second key, to obtain the first key and the length of disturbance data.

Operation 103b: The receiving device decrypts the second data by using the first key, to obtain the first data.

Operation 104b: The receiving device deducts the disturbance data from the first data according to location information used for adding the disturbance data to the raw data and the length of the disturbance data, to obtain the raw data of the picture.

In this embodiment of the present disclosure, a sending device obtains raw data of a to-be-encrypted picture, a first key, a second key, and location information that is used for adding disturbance data to the raw data; the sending device generates the disturbance data; the sending device adds the disturbance data to the raw data according to the location information, to obtain first data; and the sending device encrypts the first data by using the first key, to obtain second data, encrypts the first key and the length of the disturbance data by using the second key, to obtain first encrypted data, and sends the second data, the first encrypted data, and the second key to a receiving device. Because the disturbance data is added to the raw data, security of the raw data of the picture can be improved.

This embodiment of the present disclosure provides a method for encrypting a picture. The method is executed by a sending device. Referring to FIG. 2, the method includes the following operations:

Operation 201: A sending device obtains raw data of a to-be-encrypted picture, a first key, a second key, and location information that is used for adding disturbance data to the raw data.

When sending a picture to a second user by using a receiving server, a first user selects the picture, submits the picture to a sending device corresponding to the first user; the sending device obtains raw data of the picture. The picture may be a currently photographed picture, a locally stored picture, a picture in a third-party application, or the like.

In this embodiment of the present disclosure, the sending device does not negotiate the first key with the receiving device. Instead, the sending device randomly generates the first key and the second key, and the length of the first key is also random. To ensure security of the raw data without increasing a calculation amount of the sending device, the length of the first key is set within a range of 1024 bits to 8192 bits.

Because the sending device randomly generates the first key, the security of the encrypted raw data can be improved. In addition, to further improve the security of the raw data, the sending device may further add the disturbance data to the raw data. Therefore, in this operation, the sending device needs to obtain the location information used for adding the disturbance data to the raw data.

Before this operation, the sending device may negotiate the location information used for adding the disturbance data to the raw data with the receiving device corresponding to the second user; and the sending device directly obtains the location information that is negotiated with the receiving device and that is of the disturbance data added to the raw data. For example, the sending device and the receiving device negotiate to add the disturbance data to a data header of the raw data, or the sending device and the receiving device negotiate to add the disturbance data to a data tail of the raw data.

To improve the security of the raw data of the picture, the sending device may negotiate different location information used for adding the disturbance data to the raw data with different receiving devices, so as to improve the security of the raw data of the picture. After negotiating the location information used for adding the disturbance data to the raw data with the receiving device, the sending device stores a device identifier of the receiving device and the location information in a correspondence between device identifiers and location information.

Alternatively, before this operation, the receiving server may specify, in the sending device and the receiving device, the location information used for adding the disturbance data to the raw data; and the sending device may directly obtain the location information that is specified by the receiving server for the receiving device and that is of the disturbance data added to the raw data. For example, the receiving server may specify, in the sending device and the receiving device, that the disturbance data is added to the data header of the raw data, or that the disturbance data is added to the data tail of the raw data.

To improve the security of the raw data of the picture, the receiving server may periodically specify different location information that is used for adding disturbance data to raw data and that is negotiated between the sending device and different receiving devices, thereby improving the security of the raw data of the picture. After the receiving server specifies the location information that is used for adding the disturbance data to raw data and that is negotiated between the sending device and a receiving device, the sending device may store a device identifier of the receiving device and the location information in the correspondence between device identifiers and location information.

Correspondingly, the operation in which a sending device obtains location information used for adding disturbance data to the raw data may be:

obtaining, by the sending device from the correspondence between device identifiers and location information according to the device identifier of the receiving device, the location information used for adding the disturbance data to the raw data.

Before this operation, the sending device may negotiate, with the receiving device, a mode identifier corresponding to the location information used for adding the disturbance data to the raw data, and store the correspondence between mode identifiers and location information. For example, a mode identifier 1 corresponds to adding the disturbance data to the data header of the raw data, a mode identifier 2 corresponds to adding the disturbance data to the data tail of the raw data, a mode identifier 3 corresponds to adding the disturbance data to the raw data every 2-bit data, a mode identifier 4 corresponds to adding the disturbance data to the raw data every 10-bit data, and the like.

Further, if the sending device negotiate the mode identifier corresponding to the location information used for adding the disturbance data to the raw data with the receiving device, and stores the correspondence between the mode identifier and the location information, the sending device selects the mode identifier for adding the disturbance data to the raw data, obtains, according to the mode identifier, the location information used for adding the disturbance data to the raw data, and sends the mode identifier to the receiving device; and the receiving device receives the mode identifier sent by the sending device.

The sending device stores the correspondence between mode identifiers and location information. Correspondingly, the operation in which the sending device obtains, according to the mode identifier, the location information used for adding the disturbance data to the raw data may be:

obtaining, by the sending device from the correspondence between mode identifiers and location information according to the mode identifier, the location information used for adding the disturbance data to the raw data.

Further, the sending device needs to send the mode identifier to the receiving device. The receiving device receives the mode identifier sent by the sending device, and obtains, from the correspondence between mode identifiers and location information according to the mode identifier, the location information used for adding the disturbance data to the raw data, to deduct the disturbance data from the raw data to obtain the raw data.

For example, the raw data of the picture is PicData, the first key is K1, the length of the first key is N, and the location information that is used for adding the disturbance data to the raw data is the data header of picture data of the raw data.

Further, to improve the security of the raw data of the picture, when sending the location information or the mode identifier to the receiving device, the sending device may encrypt the location information or the mode identifier by using the second key. The sending device encrypts the location information by using the second key, and adds the encrypted location information to the first encrypted data; or the sending device encrypts the mode identifier by using the second key, and adds the encrypted mode identifier to the first encrypted data.

It should be noted that the sending device may be a terminal, or may be a server. Similarly, the receiving device may be a terminal, or may be a server.

Operation 202: The sending device generates the disturbance data.

The sending device randomly generates the disturbance data, and the length of the disturbance data is also random. To ensure the security of the raw data without increasing a calculation amount of the sending device, the length of the disturbance data is set within a range of 10 bytes to 4000 bytes.

For example, the sending device randomly generates disturbance data having a length of w1 bytes, and w1 may be greater than 10 and less than 4000. For example, w1 may be a value such as 50, 100, 1000, or 3000.

Optionally, in this embodiment, the sending device may alternatively periodically generate and save the disturbance data. For example, the sending device may generate and save the disturbance data once every hour. The length of the disturbance data periodically generated by the sending device is also random, and the length of the disturbance data may also be set within the range of 10 bytes to 4000 bytes.

Correspondingly, the sending device may not perform this operation, and directly performs the operation of operation 203 by using recently generated disturbance data saved by the sending device.

Operation 203: The sending device adds the disturbance data to the raw data according to the location information, to obtain first data.

For example, if the location information is the data header of the picture data of the raw data, the sending device adds the disturbance data to the data header of the picture data of the raw data, to obtain the first data: Data[w1]+PicData. For another example, if the location information is the data tail of the picture data of the raw data, the sending device adds the disturbance data to the data tail of the picture data of the raw data, to obtain the first data: PicData+Data[w1].

Operation 204: The sending device encrypts the first data by using the first key, to obtain second data.

The sending device obtains an iteration exclusive OR encryption algorithm, and encrypts the first data by using the iteration exclusive OR encryption algorithm and the first key, to obtain the second data. Specifically, the following operations (1) to (3) may be used for implementation, including:

(1) The sending device divides picture data of the first data into multiple picture data segments according to the length of the first key.

The length of each of the multiple picture data segments is equal to the length of the first key; or the length of each of the multiple picture data segments except the last picture data segment is equal to the length of the first key, and the length of the last picture data segment is less than the length of the first key.

For example, if the length of the first data is 4N, the sending device divides the first data into four picture data segments according to the length N of the first key, and the length of each of the four picture data segments is equal to N. For another example, if the length of the first data is greater than 3N and less than 4N, the sending device divides the first data into four picture data segments according to the length N of the first key, and the length of each of the first three picture data segments is equal to N, and the length of the fourth picture data segment is less than N.

(2) The sending device performs iteration exclusive OR on the first key and the multiple picture data segments to obtain the second data.

If the length of each of the multiple picture data segments is equal to the length of the first key, the sending device performs exclusive OR on the first key and a first picture data segment of the multiple picture data segments to obtain a first segment exclusive OR result; the sending device uses the first segment exclusive OR result as an exclusive OR key of a second picture data segment, and performs exclusive OR on the exclusive OR key of the second picture data segment and the second picture data segment to obtain a second segment exclusive OR result; the sending device then uses the second segment exclusive OR result as an exclusive OR key of a third picture data segment. The process is iterated until a last picture data segment is reached, and a segment exclusive OR result of the last picture data segment is obtained. The segment exclusive OR result of the last picture data segment is the second data.

If the length of the last picture data segment of the multiple picture data segments is less than the length of the first key, for other picture data segments except the last picture data segment, iteration processing is performed according to the foregoing exclusive OR processing method to obtain a segment exclusive OR result of a previous picture data segment closest to the last picture data segment. The exclusive OR result of the length of the last picture data segment is selected from the segment exclusive OR result of the previous picture data segment closest to the last picture data segment. Exclusive OR is performed on the selected exclusive OR result and the last picture data segment to obtain the segment exclusive OR result of the last picture data segment. Moreover, the second data includes the segment exclusive OR result of the previous picture data segment closest to the last picture data segment and the segment exclusive OR result of the last picture data segment.

For example, the sending device encrypts the first data by using the first key, to obtain the second data: EncData=K1 (Data[wl]+PicData).

Operation 205: The sending device encrypts, by using the second key, the first key, the length of the disturbance data, and a Message-Digest Algorithm 5 (MD5) value that is of the raw data and that serves as the first MD5 value, to obtain the first encrypted data.

The sending device obtains an encryption algorithm, and encrypts the first key and the length of the disturbance data by using the encryption algorithm and the second key, to obtain the first encrypted data. The sending device calculates the MD5 value of the raw data to serve as the first MD5 value, encrypts the first MD5 value of the raw data by using the second key, and adds the encrypted first MD5 value to the first encrypted data.

Further, to improve the security of the raw data of the picture, the sending device may encrypt the mode identifier by using the second key, and this operation may be:

obtaining, by the sending device, the second key, and encrypting the first key, the length of the disturbance data, the mode identifier, and the first MD5 value of the raw data by using the second key, to obtain the first encrypted data.

The encryption algorithm may be AES (an encryption algorithm), IDEA (an encryption algorithm), TEA (an encryption algorithm), or the like.

The sending device may randomly generate the second key K2, and the length of the second key is also random. The sending device may alternatively use a session key for communicating with the receiving device as the second key.

It should be noted that the sending device randomly generates the second key, and the length of the second key is also random. Therefore, the security of the encrypted raw data can be improved. In addition, because the sending device randomly generates the second key or uses the session key as the second key, the calculation amount can be reduced. Therefore, calculation resources of the sending device can be reduced.

If the sending device and the receiving device have a session key, and the session key is used as the second key, the first encrypted data is SessionKey (K1+wl). Operation 206 or operation 207 is not performed. The sending device directly sends the second data and the first encrypted data to the receiving device.

If the second key randomly generated by the sending device is K2, the first encrypted data is K2 (K1+wl+Md5 (Picdata)). Because the receiving device does not know the second key, operations 206 and 207 need to be performed, so that the sending device notifies the receiving device of the second key.

Operation 206: The sending device obtains a third key, and encrypts the second key by using the third key, to obtain second encrypted data.

The sending device obtains an RSA public key (a public key encryption algorithm) between the sending device and the receiving server, and uses the RSA public key between the sending device and the receiving server as the third key.

The receiving server may be an instant messaging server. For example, if the third key is K3, the second encrypted data is K3 (K2).

Operation 207: The sending device sends the second data, the first encrypted data, the second encrypted data, and an MD5 value of the second data to the receiving device. For ease of description, the MD5 value of the second data is referred to as a second MD5 value.

This operation may be implemented by means of the following operations (1) to (3), including:

(1) The sending device sends the second data, the first encrypted data, the second encrypted data, and the second MD5 value of the second data to the receiving server.

Further, the sending device further sends a terminal identifier of the receiving device to the receiving server. The terminal identifier of the receiving device may be a user account that is registered by the second user on the receiving server in advance, and the like. The second MD5 value of the second data is obtained by the sending device by calculating the second data.

(2) The receiving server receives the second data, the first encrypted data, and the second encrypted data that are sent by the sending device, and sends the second data, the first encrypted data, the second encrypted data, and the second MD5 value of the second data to the receiving device.

The receiving server receives the device identifier of the receiving device sent by the sending device, and sends the second data, the first encrypted data, the second encrypted data, and the second MD5 value of the second data to the receiving device according to the device identifier of the receiving device. Alternatively, the receiving server sends a notification message to the receiving device according to the device identifier of the receiving device. The receiving device receives the notification message sent by the receiving server, and sends a downloading request to the receiving server. The receiving server receives the downloading request sent by the receiving device, and sends the second data, the first encrypted data, the second encrypted data, and the second MD5 value of the second data to the receiving device according to the downloading request.

Further, the downloading request further carries a signature of an RSA public key between the receiving device and the receiving server, that is, carries the RSA public key between the receiving device and the receiving server and the device identifier of the receiving device. The receiving server determines, according to the RSA public key between the receiving device and the receiving server and the device identifier of the receiving device, whether the receiving device is a legal device. If the receiving device is a legal device, the receiving server sends the second data, the first encrypted data, and the second encrypted data to the receiving device. If the receiving device is an illegal device, the process ends.

Further, the operation in which the receiving server determines, according to the RSA public key between the receiving device and the receiving server and the device identifier of the receiving device, whether the receiving device is a legal device may be:

The receiving server stores a correspondence between device identifiers and public keys. The receiving server determines whether the correspondence between device identifiers and public keys includes a record of a correspondence between the device identifier of the receiving device and the RSA public key between the receiving device and the receiving server. If yes, the receiving server determines that the receiving device is a legal device. If not, the receiving server determines that the receiving device is an illegal device, and the process ends.

Further, the receiving server may further decrypt the second encrypted data according to an RSA private key between the sending device and the receiving server, to obtain the second key. The receiving server obtains the RSA public key between the receiving device and the receiving server, and encrypts the second key by using the RSA public key between the receiving device and the receiving server, to obtain the second data.

(3) The receiving device receives the second data, the first encrypted data, the second encrypted data, and the second MD5 value of the second data that are sent by the receiving server.

For example, the first MD5 value of the raw data may be MD5 (PicData), the second MD5 value of the second data may be MD5 (EncData), and the encrypted data may be K2 (MD5 (PicData)).

In this embodiment of the present disclosure, a sending device obtains raw data of a to-be-encrypted picture, a first key, a second key, and location information that is used for adding disturbance data to the raw data; the sending device generates the disturbance data; the sending device adds the disturbance data to the raw data according to the location information, to obtain first data; and the sending device encrypts the first data by using the first key, to obtain second data, encrypts the first key and the length of the disturbance data by using the second key, to obtain first encrypted data, and sends the second data, the first encrypted data, and the second key to a receiving device. Because the disturbance data is added to the raw data, security of the raw data of the picture can be improved.

Figure 3:
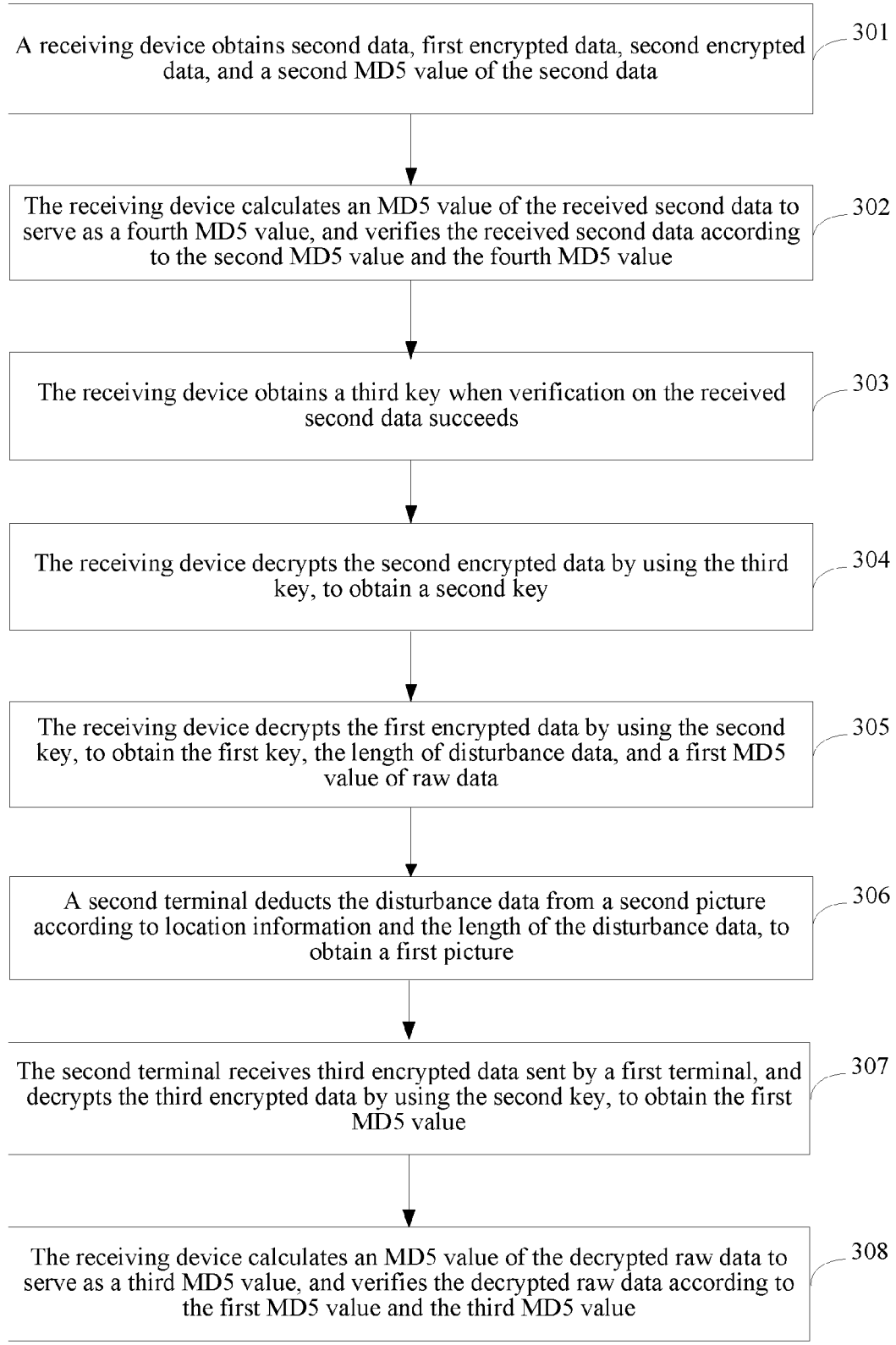
FIG. 3 is a flowchart of a method for decrypting a picture according to some embodiments of the present disclosure.

This embodiment of the present disclosure provides a method for decrypting a picture. The method is executed by a receiving device. Referring to FIG. 3, the method includes the following operations:

Operation 301: The receiving device obtains second data, first encrypted data, second encrypted data, and a second MD5 value of the second data.

The receiving device receives the second data, the first encrypted data, the second encrypted data, and the second MD5 value of the second data that are sent by a sending device. The first encrypted data is encrypted data that is obtained by encrypting a first key and the length of disturbance data by using a second key; or the first encrypted data is encrypted data that is obtained by encrypting the first key, the length of the disturbance data, a mode identifier, and a first MD5 value of raw data of a picture by using a second key. The second encrypted data is encrypted data that is obtained by encrypting the second key by using a third key.

Operation 302: The receiving device calculates an MD5 value of the received second data to serve as a fourth MD5 value, and verifies the received second data according to the second MD5 value and the fourth MD5 value.

The receiving device determines whether the received second MD5 value and the calculated fourth MD5 value are equal. If yes, the receiving device determines that the received second data is not damaged in a transmission process, that is, verification on the received second data succeeds, and the receiving device performs operation 303. If not, the receiving device determines that the received second data is damaged in a transmission process, and the process ends.

Further, if the receiving device determines that the received second data is damaged in the transmission process, the receiving device sends a retransmission request to the sending device. The sending device receives the retransmission request sent by the receiving device, and resends the second data to the receiving device.

Operation 303: The receiving device obtains a third key when verification on the received second data succeeds.

The receiving device uses an RSA private key between the receiving device and the receiving server as the third key.

Operation 304: The receiving device decrypts the second encrypted data by using the third key, to obtain the second key.

The sending device encrypts the second key by using an exclusive OR encryption algorithm and the third key, to obtain the second encrypted data. Therefore, the receiving device directly performs exclusive OR on the third key and a second encryption key when decrypting the second encrypted data, to obtain the second key.

Operation 305: The receiving device decrypts the first encrypted data by using the second key, to obtain the first key, the length of the disturbance data, and the first MD5 value of the raw data.

The sending device encrypts the first key and the length of the disturbance data by using the exclusive OR encryption algorithm and the second key. Therefore, the receiving device directly performs exclusive OR on the second key and a first encryption key when decrypting the first encrypted data, to obtain the first key, the length of the disturbance data, the mode identifier, and the first MD5 value of the raw data.

Further, if the sending device and the receiving device negotiate in advance to add location information of the disturbance data to the raw data, the receiving device obtains the negotiated location information of the disturbance data. If the sending device and the receiving device negotiate to add a mode identifier corresponding to location information of the disturbance data to the raw data and stores a correspondence between the mode identifier and the location information, the receiving device obtains, from the correspondence between the mode identifier and the location information according to the mode identifier, the location information that is of the disturbance data and that is included in the second data.

If the sending device sends the location information or the mode identifier to the receiving device, the receiving device receives the location information or the mode identifier sent by the sending device. If the sending device encrypts the location information or the mode identifier by using the second key before sending the location information or the mode identifier to the receiving device, and adds the encrypted location information or the encrypted mode identifier to the first encrypted data, the first encrypted data further includes the location information that is encrypted by using the second key, or the first encrypted data further includes the mode identifier that is encrypted by using the second key. The mode identifier is used for identifying the location information. The operation in which the receiving device obtains location information used for adding disturbance data to the raw data may be:

decrypting, by the receiving device, the first encrypted data by using the second key, to obtain the location information used for adding the disturbance data to the raw data; or decrypting, by the receiving device, the first encrypted data by using the second key, to obtain the mode identifier, and obtaining, from the correspondence between the mode identifier and the location information according to the mode identifier, the location information used for adding the disturbance data to the raw data.

Operation 306: The receiving device decrypts the second data by using the first key, to obtain first data.

The receiving device obtains an iteration exclusive OR decryption algorithm, and decrypts the second data by using the iteration exclusive OR decryption algorithm and the first key, to obtain the first data.

Operation 307: The receiving device deducts the disturbance data from the first data according to the location information and the length of the disturbance data, to obtain the raw data.

Operation 308: The receiving device calculates an MD5 value of the decrypted raw data to serve as a third MD5 value, and verifies the decrypted raw data according to the first MD5 value and the third MD5 value.

The receiving device determines whether the first MD5 value and the third MD5 value are equal. If the first MD5 value and the third MD5 value are equal, the receiving device determines that the decrypted raw data is not damaged in a transmission process, that is, verification on the decrypted raw data succeeds. If the first MD5 value and the third MD5 value are not equal, the receiving device determines that the decrypted raw data is damaged in a transmission process, that is, verification on the decrypted raw data fails. The receiving device sends the retransmission request to the sending device, and the sending device receives the retransmission request sent by the receiving device, and resends the second data to the receiving device according to the retransmission request.

It should be noted that in this embodiment of the present disclosure, a public key system of RSA may not be used. The sending device and the receiving device obtain the third key by using an ECCDH (a key exchange algorithm) algorithm. In this way, the instant messaging server neither needs to decrypt the second encrypted data, nor needs to perform encryption again to obtain the second encrypted data, thereby shortening a time of encrypting and decrypting the picture, and improving efficiency of encrypting and decrypting the picture.

In this embodiment of the present disclosure, a sending device obtains raw data of a to-be-encrypted picture, a first key, a second key, and location information that is used for adding disturbance data to the raw data; the sending device generates the disturbance data; the sending device adds the disturbance data to the raw data according to the location information, to obtain first data; and the sending device encrypts the first data by using the first key, to obtain second data, encrypts the first key and the length of the disturbance data by using the second key, to obtain first encrypted data, and sends the second data, the first encrypted data, and the second key to a receiving device. Because the disturbance data is added to the raw data, security of the raw data of the picture can be improved.

Figure 4:
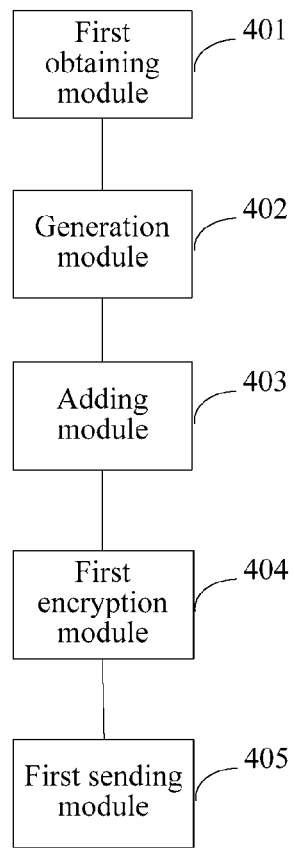
FIG. 4 is a schematic structural diagram of an apparatus for encrypting a picture according to some embodiments of the present disclosure.

This embodiment of the present disclosure provides an apparatus for encrypting a picture. The apparatus may be a sending device. Referring to FIG. 4, the apparatus includes:

a first obtaining module 401, configured to obtain raw data of a to-be-encrypted picture, a first key, a second key, and location information that is used for adding disturbance data to the raw data;

a generation module 402, configured to generate the disturbance data;

an adding module 403, configured to add the disturbance data to the raw data according to the location information, to obtain first data;

a first encryption module 404, configured to: encrypt the first data by using the first key, to obtain second data, and encrypt the first key and the length of the disturbance data by using the second key, to obtain first encrypted data; and a first sending module 405, configured to send the second data, the first encrypted data, and the second key to a receiving device.

The first sending module includes:

a first encryption unit, configured to: obtain a third key, and encrypt the second key by using the third key, to obtain second encrypted data; and a sending unit, configured to send the second encrypted data to the receiving device.

Further, the apparatus further includes:

a first calculation module, configured to: calculate a Message-Digest Algorithm 5 (MD) value of the raw data to serve as a first MD5 value, and calculate an MD5 value of the second data to serve as a second MD5 value;

a second encryption module, configured to: encrypt the first MD5 value of the raw data by using the second key, and add the encrypted first MD5 value to the first encrypted data; and a second sending module, configured to send the second MD5 value of the second data to the receiving device.

Further, the first encryption module includes:

a first obtaining unit, configured to obtain an iteration exclusive OR encryption algorithm; and a second encryption unit, configured to encrypt the first data by using the iteration exclusive OR encryption algorithm and the first key, to obtain the second data.

Further, the apparatus further includes:

a third encryption module, configured to: encrypt the location information by using the second key, and add the encrypted location information to the first encrypted data; or a third encryption module, configured to: encrypt a mode identifier by using the second key, and add the encrypted mode identifier to the first encrypted data, where the mode identifier is used by the receiving device for obtaining the location information according to the mode identifier.

In this embodiment of the present disclosure, a sending device obtains raw data of a to-be-encrypted picture, a first key, a second key, and location information that is used for adding disturbance data to the raw data; the sending device generates the disturbance data; the sending device adds the disturbance data to the raw data according to the location information, to obtain first data; and the sending device encrypts the first data by using the first key, to obtain second data, encrypts the first key and the length of the disturbance data by using the second key, to obtain first encrypted data, and sends the second data, the first encrypted data, and the second key to a receiving device. Because the disturbance data is added to the raw data, security of the raw data of the picture can be improved.

Figure 5:
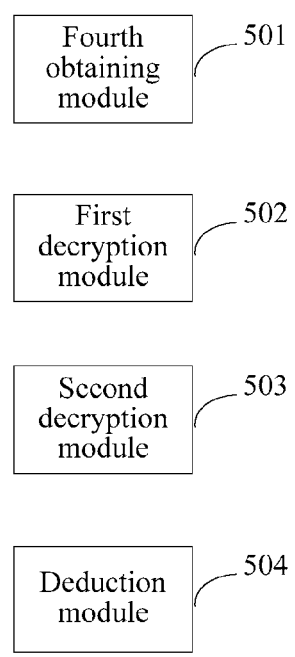
FIG. 5 is a schematic structural diagram of an apparatus for decrypting a picture according to some embodiments of the present disclosure.

This embodiment of the present disclosure provides an apparatus for encrypting a picture. The apparatus may be a receiving device. Referring to FIG. 5, the apparatus includes:

a first receiving module 501, configured to receive second data, first encrypted data, and a second key that are obtained after a picture is encrypted and that are sent by a sending device, where the second data is encrypted data that is obtained by encrypting first data by using a first key, the first data is data that is obtained by adding disturbance data to raw data of the picture, and the first encrypted data is encrypted data that is obtained by encrypting the first key and the length of the disturbance data by using the second key;

a first decryption module 502, configured to decrypt the first encrypted data by using the second key, to obtain a first key and the length of the disturbance data;

a second decryption module 503, configured to decrypt the second data by using the first key, to obtain the first data; and a deduction module 504, configured to deduct the disturbance data from the first data according to location information used for adding the disturbance data to the raw data and the length of the disturbance data, to obtain the raw data of the picture.

Further, the first receiving module 501 includes:

a receiving unit, configured to receive second encrypted data sent by the sending device, where the second encrypted data is encrypted data that is obtained by encrypting the second key by using a third key;

a second obtaining unit, configured to obtain the third key; and a first decryption unit, configured to decrypt the second encrypted data by using the third key, to obtain the second key.

Further, the first decryption module 502 includes:

a third obtaining unit, configured to obtain an iteration exclusive OR decryption algorithm; and a second decryption unit, configured to decrypt the second data by using the iteration exclusive OR decryption algorithm and the first key, to obtain the first data.

Further, the apparatus further includes:

a third decryption module, configured to decrypt the first encrypted data by using the second key, to obtain an MD5 value of the raw data;

a second receiving module, configured to receive a second MD5 value of the second data sent by the sending device;

a second calculation module, configured to: calculate an MD5 value of the decrypted raw data to serve as a third MD5 value, and calculate an MD5 value of the received second data to serve as a fourth MD5 value;

a first verification module, configured to verify the decrypted raw data according to the first MD5 value and the third MD5 value; and a second verification module, configured to verify the received second data according to the second MD5 value and the fourth MD5 value.

Further, the first encrypted data further includes the location information that is encrypted by using the second key, or the first encrypted data further includes a mode identifier that is encrypted by using the second key, where the mode identifier is used for identifying the location information.

The apparatus further includes:

a fourth decryption module, configured to decrypt the first encrypted data by using the second key, to obtain the location information; or a fourth decryption module, configured to: decrypt the first encrypted data by using the second key, to obtain the mode identifier, and obtain the location information from a correspondence between mode identifiers and location information according to the mode identifier.

In this embodiment of the present disclosure, a sending device obtains raw data of a to-be-encrypted picture, a first key, a second key, and location information that is used for adding disturbance data to the raw data; the sending device generates the disturbance data; the sending device adds the disturbance data to the raw data according to the location information, to obtain first data; and the sending device encrypts the first data by using the first key, to obtain second data, encrypts the first key and the length of the disturbance data by using the second key, to obtain first encrypted data, and sends the second data, the first encrypted data, and the second key to a receiving device. Because the disturbance data is added to the raw data, security of the raw data of the picture can be improved.

Figure 6:
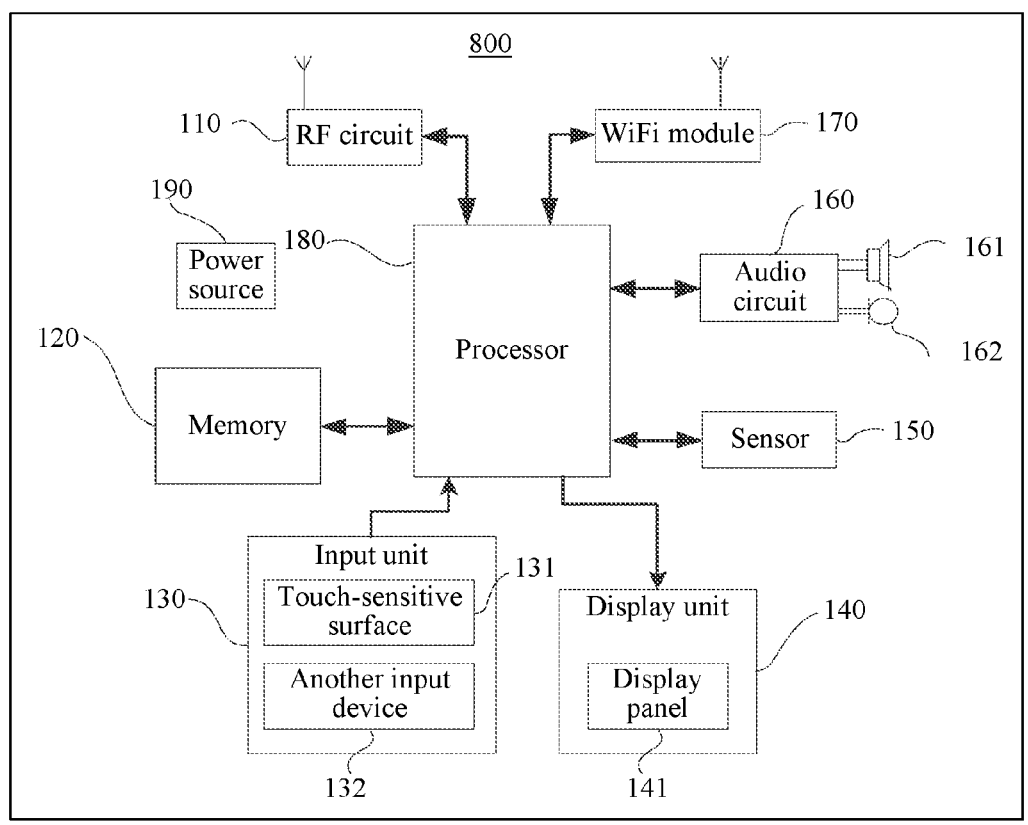
FIG. 6 is a schematic structural diagram of an apparatus for encrypting a picture according to some embodiments of the present disclosure.

Referring to FIG. 6, FIG. 6 shows a schematic structural diagram of a terminal having a touch-sensitive surface according to this embodiment of the present disclosure. The terminal provides an operation environment for the apparatus for encrypting a picture provided in some embodiments, specifically:

The terminal 800 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power source 190. A person skilled in the art may understand that a terminal structure shown in FIG. 6 constitutes no limitation to the terminal, and the terminal may include more or fewer components than those shown in the figure, or some components may be combined, or a different component deployment may be used.

The RF circuit 110 may be configured to: receive and send signals during an information receiving and sending process or a call process, particularly, after receiving downlink information of a base station, deliver the downlink information of the base station to one or more processors 180 for processing, and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may communicate with a network and another device by means of wireless communication. The wireless communication may use any communications standard or protocol, including but not limited to: Global System for Mobile communications (GSM), General Packet Radio Service (GPRS), Code Division Multiple Access (CDMA), Wideband Code Division Multiple Access (WCDMA), Long Term Evolution (LTE), emails, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound play function and an image display function), and the like. The data storage area may store data (such as audio frequency data and an address book) created according to the use of the terminal 800, and the like. In addition, the memory 120 may include a high-speed random access memory, and may also include a non-volatile memory such as at least one disk storage component, a flash memory component, or another volatile solid-state storage component. Correspondingly, the memory 120 may further include a memory controller, to provide access of the processor 180 and the input unit 130 to the memory 120.

The input unit 130 may be configured to: receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which is also referred to as a touchscreen or a touch panel, may collect a touch operation of a user on or near the touch-sensitive surface (such as an operation that is performed by a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 180. Moreover, the touch controller can receive and execute a command sent from the processor 180. In addition, the touch-sensitive surface 131 may be a resistive, capacitive, infrared, or surface acoustic wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, or a joystick.

The display unit 140 may be configured to display information entered by the user or information provided for the user, and various graphical user interfaces of the terminal 800. These graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, to determine the type of the touch event. Then, the processor 180 provides a corresponding visual output on the display panel 141 according to the type of the touch event. Although in FIG. 6, the touch-sensitive surface 131 and the display panel 141 are used as two separate parts to implement input and output functions, in some embodiments, the touch-sensitive surface 131 and the display panel 141 may be integrated to implement the input and output functions.

The terminal 800 may further include at least one sensor 150, for example, an optical sensor, a motion sensor, and other sensors. Specifically, the optical sensor may include an ambient light sensor and a proximity sensor. The ambient light sensor may adjust brightness of the display panel 141 according to luminance of the ambient light. The proximity sensor may switch off the display panel 141 and/or backlight when the terminal 800 is moved to the ear. As one type of motion sensor, a gravity acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 800 are not further described herein.

The audio circuit 160, a speaker 161, and a microphone 162 may provide an audio interface between the user and the terminal 800. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal and converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 800.

WiFi is a short distance wireless transmission technology. The terminal 800 may help, by using the WiFi module 170, the user receives and sends e-mails, browse a web page, access streaming media, and so on. WiFi provides wireless broadband Internet access for the user. Although FIG. 6 shows the WiFi module 170, it may be understood that the WiFi module 170 is not a necessary component of the terminal 800. When required, the WiFi module may be omitted provided that the essence of the present disclosure is not changed.

The processor 180 is a control center of the terminal 800, and is connected to various parts of the mobile phone by using various interfaces and lines. By running or executing the software program and/or module stored in the memory 120, and invoking data stored in the memory 120, the processor 180 executes various functions of the terminal 800 and processes data, thereby performing overall monitoring on the mobile phone. Optionally, the processor 180 may include one or more processing cores. Preferably, the processor 180 may integrate an application processor and a modem processor. The application processor mainly processes an operating system, a user interface, an application program, and the like. The modem processor mainly processes wireless communication. It may be understood that the foregoing modem processor may not be integrated into the processor 180.

The terminal 800 further includes the power source 190 (for example, a battery) that supplies power to various components. Preferably, the power source may be logically connected to the processor 180 by using a power management system, to implement functions such as charging, discharging, and power consumption management by using the power management system. The power source 190 may further include one or more of a direct current or alternate current power source, a re-charging system, a power source fault detection circuit, a power source converter or an inverter, a power source state indicator, or any other components.

Although not shown in the figure, the terminal 800 may further include a camera, a Bluetooth module, and the like, and details are not described herein. Specifically, in this embodiment, the display unit of the terminal 800 is a touchscreen display. The terminal 800 further includes a memory and one or more programs. The one or more programs are stored in the memory, and are configured to be executed by one or more processors. The one or more programs include any one of the instructions executed by the sending device in some embodiments.

Figure 7:
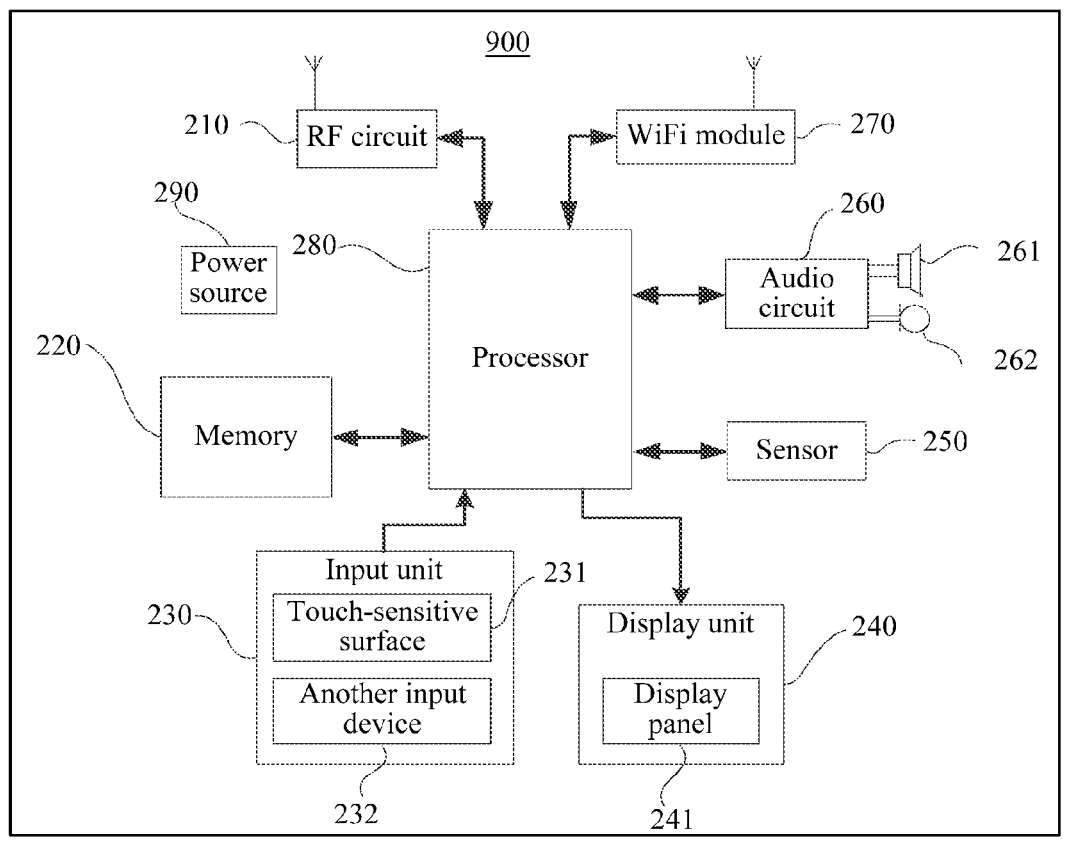
FIG. 7 is a schematic structural diagram of an apparatus for decrypting a picture according to some embodiments of the present disclosure.

Referring to FIG. 7, FIG. 7 shows a schematic structural diagram of a terminal having a touch-sensitive surface according to this embodiment of the present disclosure. The terminal provides an operation environment for the apparatus for decrypting a picture provided in some embodiments, specifically:

The terminal 900 may include components such as a radio frequency (RF) circuit 210, a memory 220 including one or more computer readable storage media, an input unit 230, a display unit 240, a sensor 250, an audio circuit 260, a wireless fidelity (WiFi) module 270, a processor 280 including one or more processing cores, and a power source 290. A person skilled in the art may understand that a terminal structure shown in FIG. 7 constitutes no limitation to the terminal, and the terminal may include more or fewer components than those shown in the figure, or some components may be combined, or a different component deployment may be used.

The RF circuit 210 may be configured to: receive and send signals during an information receiving and sending process or a call process, particularly, after receiving downlink information of a base station, deliver the downlink information of the base station to one or more processors 280 for processing, and in addition, send related uplink data to the base station. Generally, the RF circuit 210 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 210 may communicate with a network and another device by means of wireless communication. The wireless communication may use any communications standard or protocol, including but not limited to: Global System for Mobile communications (GSM), General Packet Radio Service (GPRS), Code Division Multiple Access (CDMA), Wideband Code Division Multiple Access (WCDMA), Long Term Evolution (LTE), emails, Short Messaging Service (SMS), and the like.

The memory 220 may be configured to store a software program and module. The processor 280 runs the software program and module stored in the memory 220, to implement various functional applications and data processing. The memory 220 may mainly include a program storage area and a data storage area. The program storage area may store an operating system, an application program required by at least one function (such as a sound play function and an image display function), and the like. The data storage area may store data (such as audio frequency data and an address book) created according to the use of the terminal 900, and the like. In addition, the memory 220 may include a high-speed random access memory, and may also include a non-volatile memory such as at least one disk storage component, a flash memory component, or another volatile solid-state storage component. Correspondingly, the memory 220 may further include a memory controller, to provide access of the processor 280 and the input unit 230 to the memory 220.

The input unit 230 may be configured to: receive input digit or character information, and generate a keyboard, mouse, joystick, optical, or track ball signal input related to the user setting and function control. Specifically, the input unit 230 may include a touch-sensitive surface 231 and another input device 232. The touch-sensitive surface 231, which is also referred to as a touchscreen or a touch panel, may collect a touch operation of a user on or near the touch-sensitive surface (such as an operation that is performed by a user on or near the touch-sensitive surface 231 by using any suitable object or accessory, such as a finger or a stylus), and drive a corresponding connection apparatus according to a preset program. Optionally, the touch-sensitive surface 231 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 280. Moreover, the touch controller can receive and execute a command sent from the processor 280. In addition, the touch-sensitive surface 231 may be a resistive, capacitive, infrared, or surface acoustic wave type touch-sensitive surface. In addition to the touch-sensitive surface 231, the input unit 230 may further include the another input device 232. Specifically, the another input device 232 may include, but is not limited to, one or more of a physical keyboard, a functional key (such as a volume control key or a switch key), a track ball, a mouse, or a joystick.

The display unit 240 may be configured to display information entered by the user or information provided for the user, and various graphical user interfaces of the terminal 900. These graphical user interfaces may be formed by a graph, a text, an icon, a video, or any combination thereof. The display unit 240 may include a display panel 241. Optionally, the display panel 241 may be configured by using a liquid crystal display (LCD), an organic light-emitting diode (OLED), or the like. Further, the touch-sensitive surface 231 may cover the display panel 241. After detecting a touch operation on or near the touch-sensitive surface 231, the touch-sensitive surface 231 transfers the touch operation to the processor 280, to determine the type of the touch event. Then, the processor 280 provides a corresponding visual output on the display panel 241 according to the type of the touch event. Although in FIG. 7, the touch-sensitive surface 231 and the display panel 241 are used as two separate parts to implement input and output functions, in some embodiments, the touch-sensitive surface 231 and the display panel 241 may be integrated to implement the input and output functions.

The terminal 900 may further include at least one sensor 250, for example, an optical sensor, a motion sensor, and other sensors. Specifically, the optical sensor may include an ambient light sensor and a proximity sensor. The ambient light sensor may adjust brightness of the display panel 241 according to luminance of the ambient light. The proximity sensor may switch off the display panel 241 and/or backlight when the terminal 900 is moved to the ear. As one type of motion sensor, a gravity acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 900 are not further described herein.

The audio circuit 260, a speaker 261, and a microphone 262 may provide an audio interface between the user and the terminal 900. The audio circuit 260 may convert received audio data into an electrical signal and transmit the electrical signal to the speaker 261. The speaker 261 converts the electrical signal into a sound signal for output. On the other hand, the microphone 262 converts a collected sound signal into an electrical signal. The audio circuit 260 receives the electrical signal and converts the electrical signal into audio data, and outputs the audio data to the processor 280 for processing. Then, the processor 280 sends the audio data to, for example, another terminal by using the RF circuit 220, or outputs the audio data to the memory 220 for further processing. The audio circuit 260 may further include an earplug jack, to provide communication between a peripheral earphone and the terminal 900.

WiFi is a short distance wireless transmission technology. The terminal 900 may help, by using the WiFi module 270, the user receive and send e-mails, browse a web page, access streaming media, and so on. WiFi provides wireless broadband Internet access for the user. Although FIG. 7 shows the WiFi module 270, it may be understood that the WiFi module 270 is not a necessary component of the terminal 900. When required, the WiFi module may be omitted provided that the essence of the present disclosure is not changed.

The processor 280 is a control center of the terminal 900, and is connected to various parts of the mobile phone by using various interfaces and lines. By running or executing the software program and/or module stored in the memory 220, and invoking data stored in the memory 220, the processor 280 executes various functions of the terminal 900 and processes data, thereby performing overall monitoring on the mobile phone. Optionally, the processor 280 may include one or more processing cores. Preferably, the processor 280 may integrate an application processor and a modem processor. The application processor mainly processes an operating system, a user interface, an application program, and the like. The modem processor mainly processes wireless communication. It may be understood that the foregoing modem processor may not be integrated into the processor 280.

The terminal 900 further includes the power source 290 (for example, a battery) that supplies power to various components. Preferably, the power source may be logically connected to the processor 280 by using a power management system, to implement functions such as charging, discharging, and power consumption management by using the power management system. The power source 290 may further include one or more of a direct current or alternate current power source, a re-charging system, a power source fault detection circuit, a power source converter or an inverter, a power source state indicator, or any other components.

Although not shown in the figure, the terminal 900 may further include a camera, a Bluetooth module, and the like, and details are not described herein. Specifically, in this embodiment, the display unit of the terminal 900 is a touchscreen display. The terminal 900 further includes a memory and one or more programs. The one or more programs are stored in the memory, and are configured to be executed by one or more processors. The one or more programs include any one of the instructions executed by the receiving device in some embodiments.

It should be noted that when the apparatus for encrypting a picture and the apparatus for decrypting a picture provided in the foregoing embodiments encrypt or decrypt a picture, it is illustrated with an example of division of each functional module. During actual application, the function distribution may be completed by different functional modules according to requirements, that is, the internal structure of the apparatus is divided into different functional modules, so as to complete all or part of the functions described above. In addition, the apparatus for encrypting a picture and the method for encrypting a picture that are provided in the foregoing embodiments belong to a same idea, and the apparatus for decrypting a picture and the method for decrypting a picture belong to a same idea. For detailed implementation processes, refer to the method embodiments, and details are not described herein again.

In an example of the embodiments, a non-transitory computer readable storage medium including instructions, for example, a memory including instructions is further provided. The instructions may be executed by a processor of the terminal, to complete the method for encrypting a picture and the method for decrypting a picture. For example, the non-transitory computer readable storage medium may be a ROM, a random access memory (RAM), a CD-ROM, a tape, floppy disk, an optical data storage device, and the like.

A person of ordinary skill in the art may understand that all or some of the operations of the embodiments may be implemented by hardware or a program instructing related hardware. The program may be stored in a computer-readable storage medium. The storage medium may include a read-only memory, a magnetic disk, or an optical disc.

The foregoing descriptions are merely examples of the embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for encrypting a picture performed at a sending device having one or more processors and memory storing programs to be executed by the one or more processors, the method comprising:

obtaining, by the sending device, raw data of a to-be-encrypted picture, a first key, a second key, and location information that is used for adding disturbance data to the raw data;

adding, by the sending device, the disturbance data to the raw data according to the location information, to obtain first data;

encrypting, by the sending device, the first data by using the first key, to obtain second data, and encrypting the first key and the length of the disturbance data by using the second key, to obtain first encrypted data; and sending, by the sending device, the second data, the first encrypted data, and the second key to a receiving device.

2. The method according to claim 1, wherein the sending device and the receiving device are in a chat session of a social networking application and the to-be-encrypted picture is part of a message that the sending device sends to the receiving device through the chat session.

3. The method according to claim 2, wherein the disturbance data is a comment of the to-be-encrypted picture provided by a user of the sending device through the chat session.

4. The method according to claim 1, wherein the location information is negotiated between the sending device and the receiving device independently from the sending, by the sending device, the second data, the first encrypted data, and the second key to the receiving device.

5. The method according to claim 1, wherein the location information is determined by the sending device according to a predefined algorithm and a current timestamp of the sending, by the sending device, the second data, the first encrypted data, and the second key to the receiving device.

6. The method according to claim 1, wherein the sending, by the sending device, the second key to a receiving device comprises:
    encrypting, by the sending device, the second key by using a third key, to obtain second encrypted data; and
    sending, by the sending device, the second encrypted data to the receiving device.

7. The method according to claim 1, further comprising:
    calculating, by the sending device, a Message-Digest Algorithm 5 (MD5) value of the raw data to serve as a first MD5 value, and calculating an MD5 value of the second data to serve as a second MD5 value;
    encrypting, by the sending device, the first MD5 value by using the second key, and adding the encrypted first MD5 value to the first encrypted data; and
    sending, by the sending device, the second MD5 value to the receiving device.

8. The method according to claim 1, wherein the encrypting, by the sending device, the first data by using the first key, to obtain second data comprises:
    encrypting, by the sending device, the first data by using an iteration exclusive OR encryption algorithm and the first key, to obtain the second data.

9. The method according to claim 1, further comprising:
    encrypting, by the sending device, the location information by using the second key, and adding the encrypted location information to the first encrypted data; and
    encrypting, by the sending device, a mode identifier by using the second key, and adding the encrypted mode identifier to the first encrypted data, wherein the mode identifier is used for identifying the location information.

10. A sending device, comprising:
    one or more processors;
    memory; and
    one or more programs stored in the memory, wherein the one or more programs, when executed by the one or more processors, cause the sending device to perform a plurality of operations including:
        obtaining, by the sending device, raw data of a to-be-encrypted picture, a first key, a second key, and location information that is used for adding disturbance data to the raw data;
        adding, by the sending device, the disturbance data to the raw data according to the location information, to obtain first data;
        encrypting, by the sending device, the first data by using the first key, to obtain second data, and encrypting the first key and the length of the disturbance data by using the second key, to obtain first encrypted data; and
        sending, by the sending device, the second data, the first encrypted data, and the second key to a receiving device.

11. The sending device according to claim 10, wherein the sending device and the receiving device are in a chat session of a social networking application and the to-be-encrypted picture is part of a message that the sending device sends to the receiving device through the chat session.

12. The sending device according to claim 11, wherein the disturbance data is a comment of the to-be-encrypted picture provided by a user of the sending device through the chat session.

13. The sending device according to claim 10, wherein the location information is negotiated between the sending device and the receiving device independently from the sending, by the sending device, the second data, the first encrypted data, and the second key to the receiving device.

14. The sending device according to claim 10, wherein the location information is determined by the sending device according to a predefined algorithm and a current timestamp of the sending, by the sending device, the second data, the first encrypted data, and the second key to the receiving device.

15. The sending device according to claim 10, wherein the sending, by the sending device, the second key to a receiving device comprises:
    encrypting, by the sending device, the second key by using a third key, to obtain second encrypted data; and
    sending, by the sending device, the second encrypted data to the receiving device.

16. The sending device according to claim 10, wherein the plurality of further comprising:
    calculating, by the sending device, a Message-Digest Algorithm 5 (MD5) value of the raw data to serve as a first MD5 value, and calculating an MD5 value of the second data to serve as a second MD5 value;
    encrypting, by the sending device, the first MD5 value by using the second key, and adding the encrypted first MD5 value to the first encrypted data; and
    sending, by the sending device, the second MD5 value to the receiving device.

17. The sending device according to claim 10, wherein the encrypting, by the sending device, the first data by using the first key, to obtain second data comprises:
    encrypting, by the sending device, the first data by using an iteration exclusive OR encryption algorithm and the first key, to obtain the second data.

18. The sending device according to claim 10, wherein the plurality of further comprising:
    encrypting, by the sending device, the location information by using the second key, and adding the encrypted location information to the first encrypted data; and
    encrypting, by the sending device, a mode identifier by using the second key, and adding the encrypted mode identifier to the first encrypted data, wherein the mode identifier is used for identifying the location information.

19. A non-transitory computer readable storage medium storing one or more programs, wherein the one or more programs, when executed one or more processors of a sending device, cause the sending device to perform a plurality of operations including:
    obtaining, by the sending device, raw data of a to-be-encrypted picture, a first key, a second key, and location information that is used for adding disturbance data to the raw data;
    adding, by the sending device, the disturbance data to the raw data according to the location information, to obtain first data;
    encrypting, by the sending device, the first data by using the first key, to obtain second data, and encrypting the first key and the length of the disturbance data by using the second key, to obtain first encrypted data; and sending, by the sending device, the second data, the first encrypted data, and the second key to a receiving device.

20. The non-transitory computer readable storage medium according to claim 19, wherein the sending device and the receiving device are in a chat session of a social networking application and the to-be-encrypted picture is part of a message that the sending device sends to the receiving device through the chat session.

\* \* \* \* \*